(12) United States Patent  (10) Patent No.: US 8,365,638 B2
Paxton  (45) Date of Patent: Feb. 5, 2013

(54) TUBULAR SOIL AUGER AND MANUFACTURING METHOD

(76) Inventor: Frank Paxton, Kansas City, MO (US)

( * ) Notice: Subject to any disclaimer, the term of this patent is extended or adjusted under 35 U.S.C. 154(b) by 418 days.

(21) Appl. No.: 12/748,553

(22) Filed: Mar. 29, 2010

(65) Prior Publication Data

US 2010/0243332 A1  Sep. 30, 2010

Related U.S. Application Data

(60) Provisional application No. 61/165,260, filed on Mar. 31, 2009.

(51) Int. Cl.
*B21K 5/02* (2006.01)
(52) U.S. Cl. .......................................... 76/102; 175/403
(58) Field of Classification Search .................... 76/102; 29/557; 30/DIG. 7; 175/403; 111/113; 172/25
See application file for complete search history.

(56) References Cited

U.S. PATENT DOCUMENTS

| 2,987,922 | A | * | 6/1961 | Harrington | 73/864.44 |
| 3,847,227 | A | * | 11/1974 | Myers | 172/378 |
| 4,653,336 | A | * | 3/1987 | Vollweiler | 73/864.44 |
| 4,779,689 | A |  | 10/1988 | Paxton, III |  |
| 5,461,788 | A | * | 10/1995 | Taylor | 30/300 |
| 5,492,021 | A | * | 2/1996 | Bourgeois et al. | 73/864.45 |
| 7,131,506 | B2 | * | 11/2006 | Hamilton et al. | 175/403 |
| 2010/0243332 | A1 | * | 9/2010 | Paxton, III | 175/403 |

* cited by examiner

*Primary Examiner* — Hwei C Payer
(74) *Attorney, Agent, or Firm* — Law Office of Mark Brown, LLC; Mark E. Brown

(57) ABSTRACT

A soil auger for creating smooth-walled cylindrical holes in the earth is provided for use with a drill. The auger has a central rotational axis with a tubular body that is open at a bottom cutting end, and enclosed at a top end by a cap assembly. The cap assembly has a top wall and a bottom wall. The top and bottom walls have apertures aligned with the central rotational axis for receiving a shaft in alignment therewith, and for attachment to a drill. The distance between the top wall and bottom wall compared to the overall length of the assembled auger determines the minimum height of the cap assembly to minimize the rotational imbalance of the auger during use for a given body length. A method of manufacturing the auger is provided using precision cutting tools to create apertures in the body and to maintain concentricity of the auger components.

5 Claims, 5 Drawing Sheets

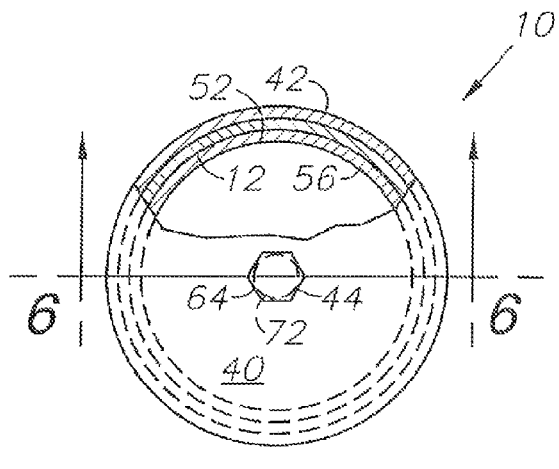
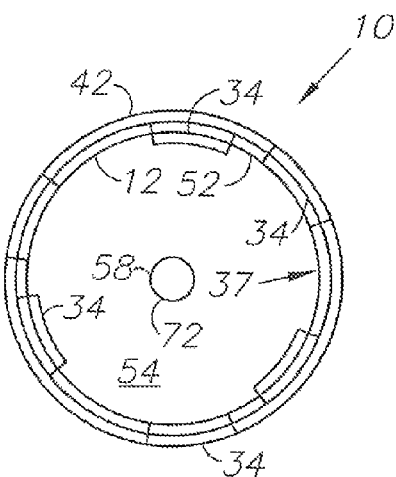
FIG. 4    FIG. 5
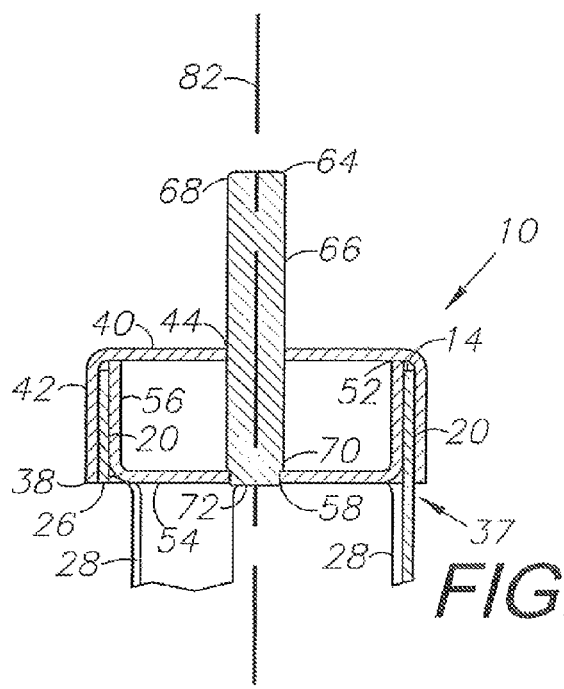
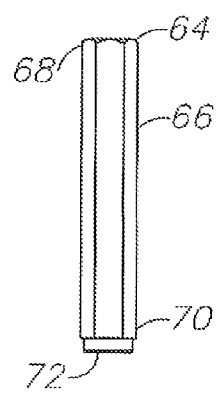
FIG. 6    FIG. 7

TUBULAR SOIL AUGER AND MANUFACTURING METHOD

CROSS-REFERENCE TO RELATED APPLICATIONS

This application claims priority in Provisional Patent Application No. 61/165,260, filed Mar. 31, 2009, which is incorporated herein by reference.

BACKGROUND OF THE INVENTION

1. Field of the Invention

The present invention relates generally to earth working equipment, and in particular a tubular soil auger for creating a cylindrical hole in the ground.

2. Description of the Related Art

A cylindrical cutting tool that rotates along a central vertical axis enables a user to create a cylindrical hole. A solid cylindrical tool, such as a drill bit, removes a volume of material displaced by the volume of the tool. The larger the cross-section of the solid tool, the larger the diameter of hole that may be created. However, solid tools with a large volume are inherently limited in their utility and the types of machines that can effectively provide enough torque to rotate the tool and create a hole. A hollow, rotating tubular cutting tool may be used to create cylindrical holes having a large diameter by only removing material at the periphery of a plug of the material that is later removed to create the hole. Because the tubular cutting tool itself is cutting or removing little material relative to the volume of material or plug that may be removed, such tools may be used in a wide variety of settings with machines that have low torque or operate at high speeds. However, with tubular tools, if the mass of the tool is not equally balanced, distributed, and aligned along the central vertical axis of the tool, rotation of tool at high speed makes the tool susceptible to wobbling or shaking resulting in damage to the tool, machine, or operator, or difficulty forming a clean hole.

Cylindrical cutting tools are often connected to a power source by an elongated shaft. Typically, the shaft connects to the top of the cylindrical cutting tool at one contact point requiring straightening or truing of the tool and shaft to ensure the tool does not wobble or shake during use causing damage to the power source or operator.

The design and manufacture of tubular cutting tools often involves removal of material from the tool to decrease the mass of the tool, and to facilitate removal of the plug. However, conventional methods of manufacture employ die presses to remove material that can distort the roundness of the tubular wall thereby affecting the balance and distribution of mass of the tool. As a result, such tools are susceptible to wobbling and shaking during use, and have difficulty forming clean holes.

What is needed is a tubular cutting tool that may be rotated at high speed without wobbling or shaking about the central vertical axis of the tool, and a manufacturing method that produces tubular cutting tools that are relatively free from such wobbling or shaking without need of after welding truing or straightening.

Heretofore there has not been available a tubular cutting tool or tubular cutting tool manufacturing method with the advantages and features of the present invention.

SUMMARY OF THE INVENTION

An auger having a tubular body with a central axis is adapted for use with a rotational power source for creating smooth-walled cylindrical holes in the earth. The auger is manufactured using precision cutting tools to create apertures and notches in the tubular body without deforming the concentricity of the tubular body. A cap assembly is attached to an end of the tubular body and includes a pair of opposing, upwardly-open tubes; an inner cap, and an outer cap. Each cap has a unique centrally-located aperture located in an end wall wherein the aperture is aligned with the central axis of the tubular body. The alignment of the cap apertures, the unique configuration of the cap apertures, and the distance between the cap apertures ensures proper alignment and secure engagement of a shaft that is attached to a rotational power source, such as an electric drill. Identifying a preferred distance between cap apertures for a given tubular body length, and manufacturing a tubular body using precision cutting tools and precision welding, produces a tool that may be rotated at high speed with less wobbling or shaking about the central vertical axis of the tool.

BRIEF DESCRIPTION OF THE DRAWINGS

The drawings constitute a part of this specification and include exemplary embodiments of the present invention illustrating various objects and features thereof, wherein like references are generally numbered alike in the several views.

FIG. 4 is a top view of the soil auger.

FIG. 5 is a bottom view of the soil auger.

FIG. 6 is a section view of the upper assembly of the soil auger taken generally along the line 6 in FIG. 4.

FIG. 7 is an elevational view of the shaft.

DESCRIPTION OF THE PREFERRED EMBODIMENT

I. Introduction and Environment

Figure 1:
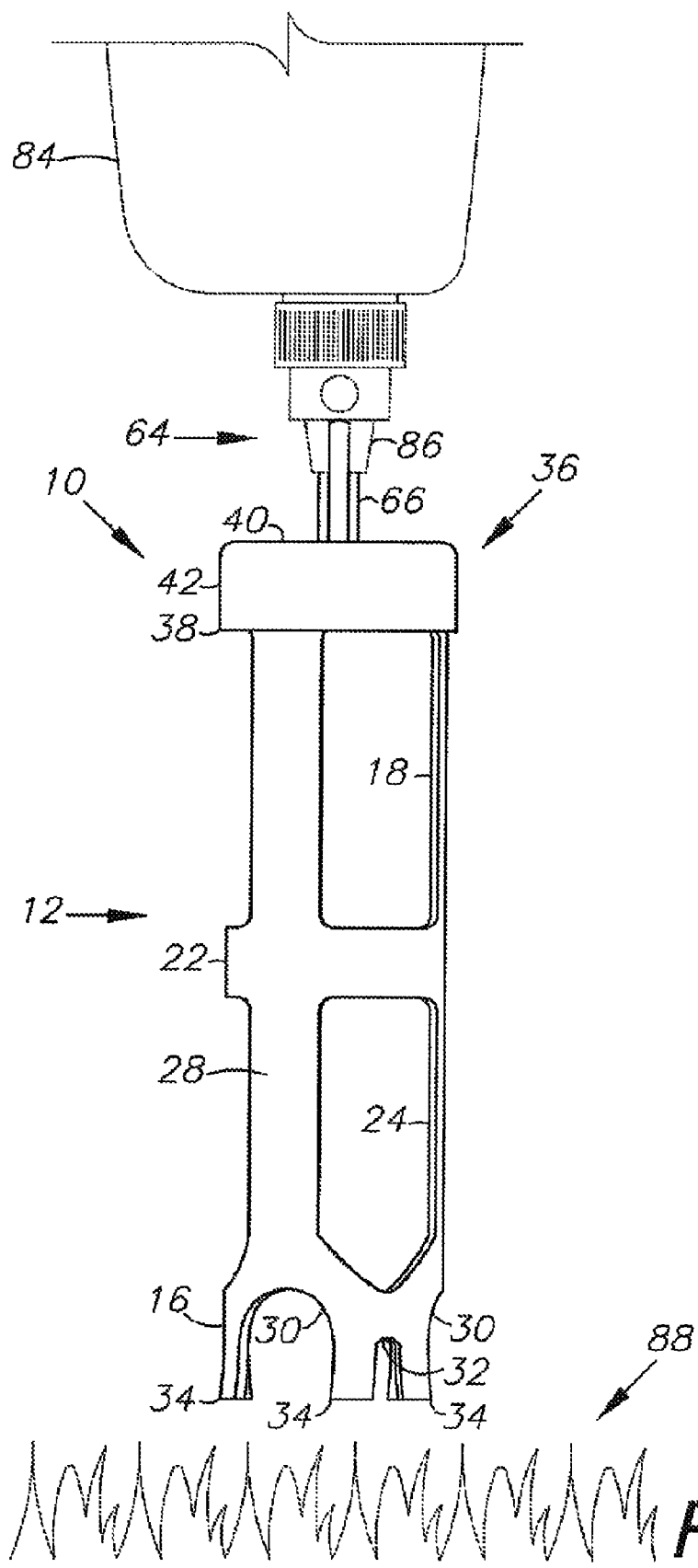
FIG. 1 is an elevational view of the soil auger attached to an electric drill embodying the principles of the invention.

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, top, upper, bottom, and lower refer to the invention as orientated in the view being referred to. Said terminology will include the words specifically mentioned, derivatives thereof and words of similar meaning.

II. Preferred Embodiment Tubular Auger 10

Referring to the drawings in more detail, the reference numeral 10 generally designates a tubular auger embodying the principles of the present invention. The auger 10 is manufactured from rigid components including, but not limited to steel, and comprises an elongated tubular body 12 with a plurality of teeth 34 at a bottom end 16, and a cap assembly 36 at a top end 14 mounting a shaft 64. The mass associated with the components are distributed and aligned along a central rotational axis 82 of the body 12 thereby minimizing wobbling or shaking of the auger 10 when in use. The shaft 64 is attached to a rotational power source including, but not limited to a compressed air motor, a hydraulic motor, an internal combustion engine, or an electric motor. Preferably, the shaft 64 is received within the chuck 86 of an electric drill 84 for creating smooth-walled cylindrical holes in the earth 88.

Figure 2:
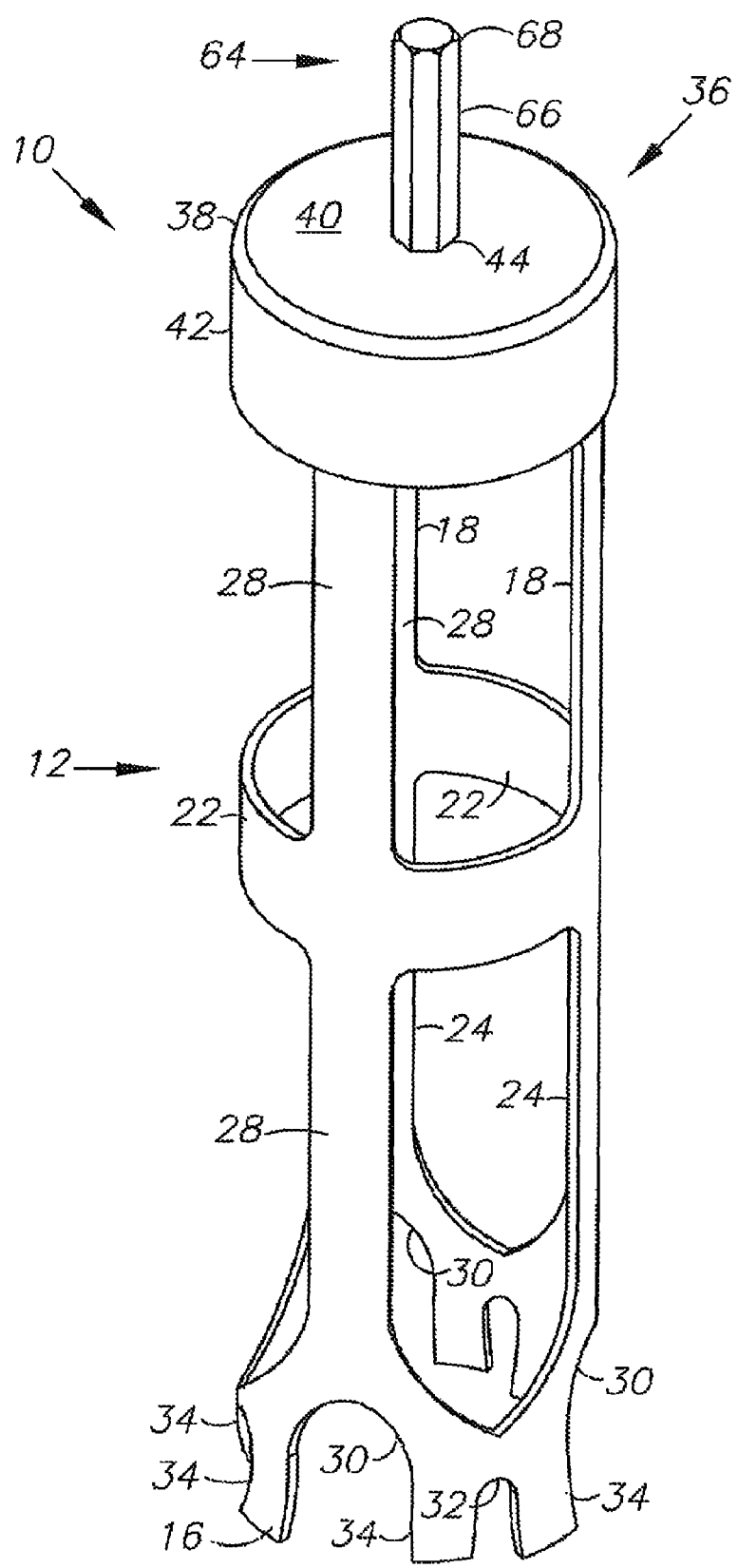
FIG. 2 is a perspective view of the soil auger.
Figure 3:
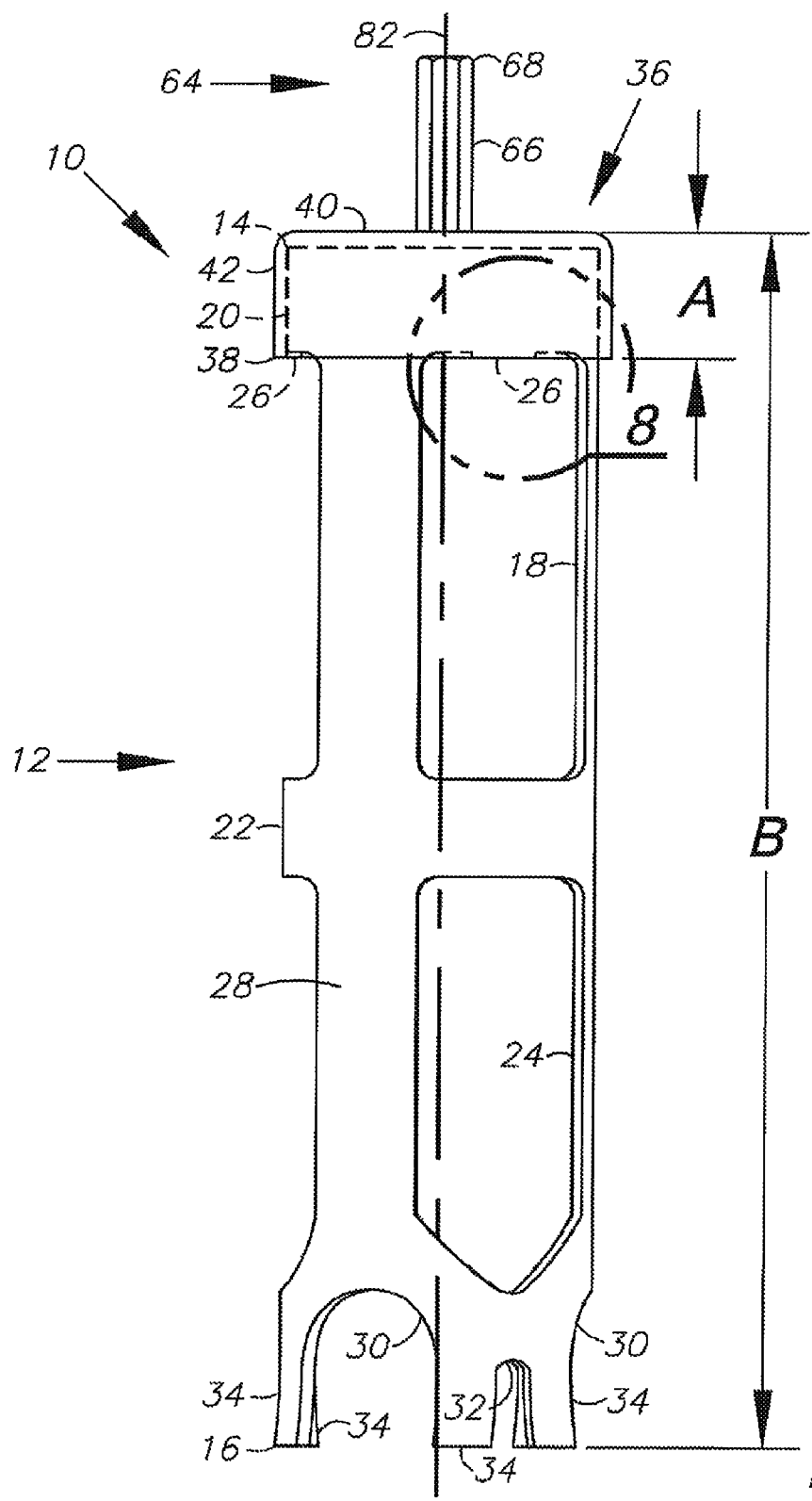
FIG. 3 is an elevational view of the soil auger.
Figure 8:
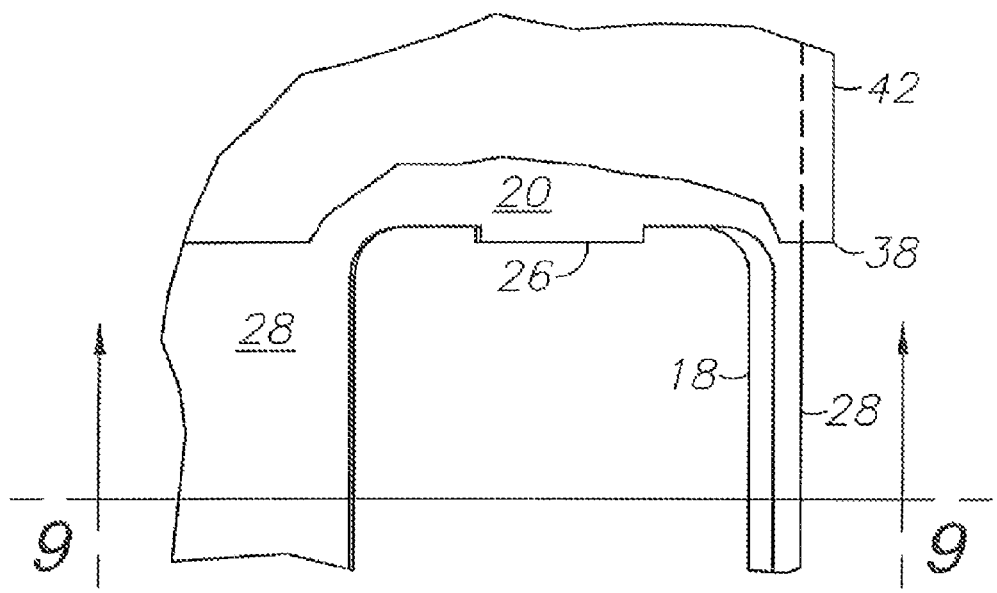
FIG. 8 is an enlarged view of the outer cap and weld tab with the outer cap cut away taken generally within circle 8 in FIG. 3.
Figure 9:
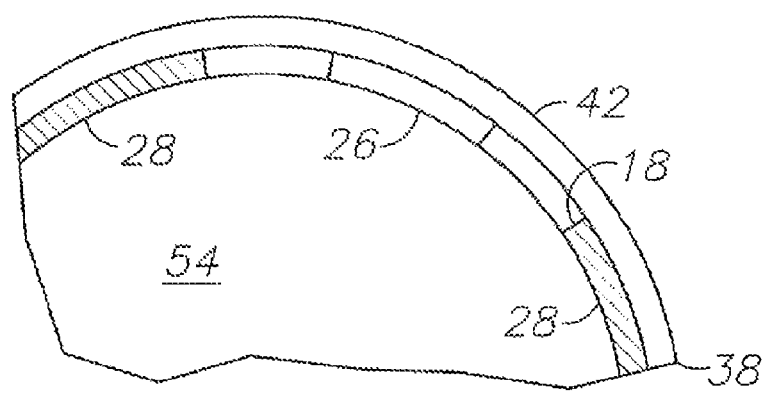
FIG. 9 is a section view of the upper portion of the auger taken along the line 9 in FIG. 8.

Referring to FIGS. 1-3, the body 12, and its various apertures and features, may be formed by precision cutting of a single piece of tubular steel. The precision cutting may be performed by, but is not limited to, rotary tools, water jet cutting, or lasers, preferably lasers. Precision cutting of steel using lasers creates a hardened, smooth edge along the exposed edge of the material that requires no deburring. At least two, preferably three generally rectangular upper apertures 18 extend through the body 12. Each upper aperture 18 is bound by the tubular body 12: at the top by a top band 20; at the bottom by a middle band 22; and on the sides by vertical bands 28. At least two, preferably three elongated pentagonal lower apertures 24 having a triangular-shaped bottom portion extend through the body 12 are located below the aforementioned upper apertures 18. The lower apertures 24 are bound by the tubular body 12: at the top by the middle band 22; at the bottom by the teeth 34; and on the side by the vertical bands 28. The apertures 18, 24, and bands 20, 22, and 28 are equally spaced around the body 12 to keep the mass of the body 12 in dynamic balance during rotation about the central rotational axis 82.

Referring to FIGS. 3-6, and 8-9, the top band 20 of the body 12 is secured within a cap assembly 36 at a cap assembly interface 37 by suitable means, such as welding. The cap assembly 36 is disposed at the top end 14 of the body 12 and comprises an inner cap 52 having a bottom wall 54 with an aperture 58, and an outer cap 38 having a top wall 40 with an aperture 44. The bottom wall 54 is located within the body 12, and the top wall 40 is located at the top end 14 of the body 12. Each top band 20 has a weld tab 26 depending therefrom into each upper aperture 18. The weld tab 26 is heated and fused during welding, with a minimal amount of weld rod, creating weld fill at the cap assembly interface 37. Variations in the amount of weld fill at the cap assembly interface 37 can create an imbalance in the auger 10 during rotation because of unequal distribution of mass around the central rotational axis 82. The precision cut weld tabs 26 provide a consistent size and shape of material that is fused to the cap assembly 36 thereby minimizing deposition of excess weld fill that may cause an imbalance in the auger 10.

The inner cap 52 may alternatively include an upwardly-open tube with a sidewall 56 that is enclosed at one end by a bottom wall 54. A centrally-located circular aperture 58 extends through the bottom wall 54 for receiving the circular extension 72 of the shaft 64. The outer cap 38 may alternatively include a downwardly-open tube with a sidewall 42 that is sealed at one end by a top wall 40. A centrally-located hexagonal aperture 44 extends through the top wall 40 for receiving the hexagonal body 66 of the shaft 64.

Referring to FIGS. 6-7, a shaft 64 extends beyond the top wall 40 of the outer cap 38 and provides attachment to a rotational power source, such as a drill 84. The shaft 64 may be manufactured from a single piece of metal and has an elongated hexagonal body 66 extending between a top end 68 and a bottom end 70, with a cylindrical extension 72 protruding from the bottom end 70. The mass of the shaft 64 is balanced along the center or longitudinal axis of the shaft 64 between the top end 68 and the bottom of the cylindrical extension 72. The extension 72 is received within the circular aperture 58 whereby the longitudinal axis of the shaft 64 aligns with the central rotational axis 82, and the extension 72 may be secured to the inner cap 52 by suitable means such as welding. The fit of the extension 72 within the circular aperture 58 may be by precision fit to ensure concentricity of the shaft 64 and body 12 thereby avoiding the need to true the shaft 64 to the body 12. The hexagonal body 66 extends through the hexagonal aperture 44 and is fixedly secured therein, and extends further above the outer cap 38 for capture by the chuck 86 of a drill 84. Securing the bottom end 70 of the shaft 64 to the inner cap 52, and passing the hexagonal body 66 through the hexagonal aperture 44 of the outer cap 38 further allows precise alignment of the center of the shaft 64 with the central rotational axis 82 and prevents the shaft 64 from rotating within the cap assembly 36 due to the angular engagement of the shaft 64 with the hexagonal aperture 44 of the outer cap 38.

Depending from the bottom end 16 of the body 12 are a plurality of teeth 34 formed from the body 12. A pair of teeth 34 are located beneath each lower aperture 24 and are separated by a small U-shaped secondary tooth notch 32. Each tooth 34 pair is separated from an adjacent tooth 34 pair by a large U-shaped primary tooth notch 30 located below each vertical band 28. Each tooth 34 has an alternating conformation inward and outward relative to the exterior surface of the body 12.

The manufacturing and design considerations integrated into the auger 10 enable manufacturing of a tubular cutting tool that has a shaft 64 which is accurately aligned with the central rotational axis 82 of the body 12, and a cap assembly 36 that is of sufficient height to stabilize the shaft 64 and minimize the wobbling or shaking of the auger 10 when in use.

The various manufacturing features addressed above, such as precision cutting of the body 12, ensures the concentricity of the body 12 remains true. Precision cutting of the various apertures 18, 24, tabs 26, and notches 30, 32 avoids using die presses to create the apertures and notches. The use of a die press on a tubular body causes distortion of the concentricity of the tube thereby distributing the mass of the remaining tube different distances from the central rotational axis of the tube. Such unequal distribution of mass causes wobbling and imbalance of the tube when rotated at high speed around its central rotational axis. Precision cutting of the body 12 avoids distortion of the body 12 and leaves the remaining body 12 material equally spaced around the central rotational axis 82 which minimizes the unequal distribution of mass that can cause wobbling of the auger 10 during use. In addition, manufacturing the caps 38, 52 with apertures 44, 58 that are centered along the central rotational axis 82 of the body 12 ensures proper alignment of the shaft 64 along the central rotational axis 82 further minimizing the potential wobbling of the auger 10 during use. In addition, manufacturing and assembling the auger 10 using an optimized height of the cap assembly 36 further minimizes potential wobble or imbalance of the auger 10 during use because the closer the apertures 44, 58 are together, the less distance there is between the contact points between the shaft 64 and the caps 38, 52, which can decrease the concentricity of the connection between the shaft 64 and the body 12.

Referring to FIG. 3, the preferred minimum height of the cap assembly 36, specifically the distance between the top wall 40 and bottom wall 54, to minimize potential wobble or imbalance of the auger 10 during use, and to ensure proper alignment of the shaft 64, is a ratio determined relative to the overall height of the assembled auger 10. The preferred height of the cap assembly 36 can be mathematically represented by the following formula:

$$A/B = C$$

where
A=the height of the cap assembly 36 determined by the distance between the top wall 40 and bottom wall 54;
B=the overall height of the assembled auger 10 determined by the distance between the bottom end 16 and top wall 40; and
C=is a ratio value of at least about 0.1.

By way of example, for an auger 10 having an overall height B of 6.0 inches, and a ratio value C of 0.097, the preferred minimum height A of the cap assembly 36 is:

$$A/(6 \text{ inches}) = 0.097;$$

$$A = 0.6 \text{ inches}.$$

By way of another example, for an auger 10 having an overall height B of 7.875 inches, and a ratio value C of 0.097, the preferred minimum height A of the cap assembly 36 is:

$$A/(7.875 \text{ inches}) = 0.097;$$

$$A = 0.764 \text{ inches}.$$

By way of another example, for an auger 10 having an overall height B of 7.81 inches, and a ratio value C of 0.10, the preferred minimum height A of the cap assembly 36 is:

$$A/(7.81) = 0.10;$$

$$A = 0.78 \text{ inches}.$$

It will be appreciated that the components of the auger 10 can be used for various other applications. Moreover, the auger 10 can be fabricated in various sizes and from a wide range of suitable materials, using various alternative manufacturing and fabrication techniques.

It is to be understood that while certain aspects of the invention have been shown and described, the invention is not limited thereto and encompasses various other embodiments and aspects.

Having thus described the invention, what is claimed as new and desired to be secured by Letters Patent is:

1. A method of manufacturing an auger, comprising the steps of:
   providing a tubular body extending along a central axis between a top end of the body and a bottom end of the body, said tubular body having an upper portion and a lower portion;
   providing a precision cutting tool for cutting apertures through, and notches in, said tubular body;
   cutting three equally spaced rectangular apertures through the upper portion of said tubular body;
   cutting a tab from a top portion of each said rectangular aperture;
   cutting three equally spaced elongated pentagonal apertures having a triangular vertex through the lower portion of said tubular body with said triangular vertex proximate to said tubular body bottom end;
   cutting three pairs of teeth at said body bottom end;
   cutting a downwardly-open U-shaped notch between each tooth pair, and a downwardly-open U-shaped notch between each tooth of each tooth pair;
   cutting a shaft having an elongated hexagonal body extending between a top end of the shaft and a bottom end of the shaft;
   cutting a cylindrical extension depending from said shaft bottom end;
   cutting an inner cap having a bottom wall;
   cutting a circular aperture through said inner cap bottom wall aligned with said central axis of said tubular body;
   cutting an outer cap having a top wall;
   cutting a hexagonal aperture through said outer cap top wall aligned with said central axis of said tubular body;
   nesting said inner cap within said tubular body upper portion;
   nesting said outer cap at said tubular body upper portion;
   positioning said inner cap bottom wall and said outer cap top wall a distance apart, wherein the ratio of the distance between said bottom wall and said top wall to said body length is a ratio of at least about 0.1;
   securing said inner cap and said outer cap to said tubular body by melting and welding said tab; and
   securing said shaft within said outer cap hexagonal aperture, and welding said cylindrical extension within said inner cap circular aperture.

2. The method of manufacturing an auger of claim 1, further including the steps of:
   forming said inner cap into an upwardly-open tube having a sidewall; and
   forming said outer cap into a downwardly-open tube having a sidewall.

3. The method of manufacturing an auger of claim 1, which includes the additional steps of:
   laser-cutting said body;
   forming full-thickness square leading edges of said teeth in said laser-cutting step; and
   heat-tempering said teeth leading edges in said laser-cutting step.

4. The method of manufacturing an auger of claim 1, wherein cutting is performed by a water jet.

5. The method of manufacturing an auger of claim 1, wherein securing comprises welding.

* * * * *